Figures 1, 2:
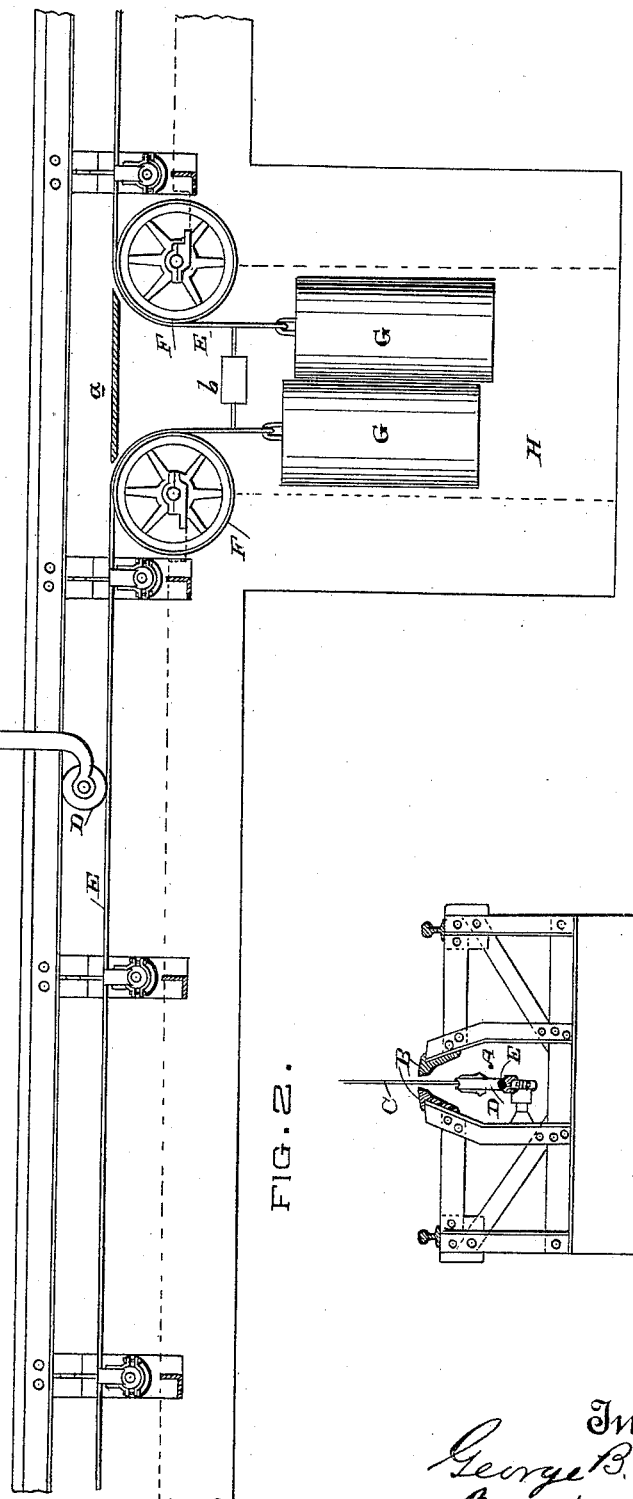

(No Model.)   2 Sheets—Sheet 1.

G. B. FRALEY.
ELECTRIC RAILWAY.

No. 411,496.   Patented Sept. 24, 1889.

Witnesses,
Inventor,
George B. Fraley
By Dewey
Atty (No Model.) 2 Sheets—Sheet 2.
G. B. FRALEY.
ELECTRIC RAILWAY.
No. 411,496. Patented Sept. 24, 1889.
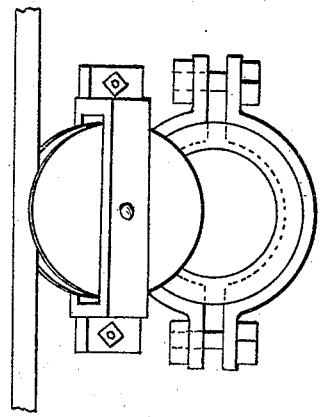
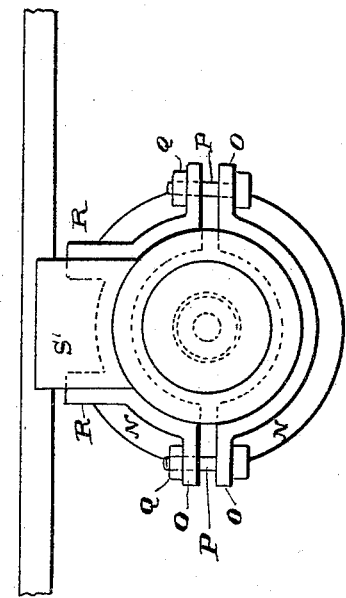
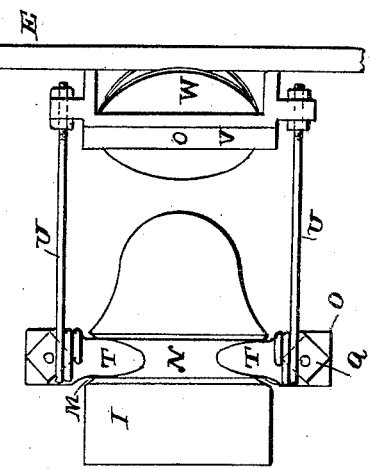
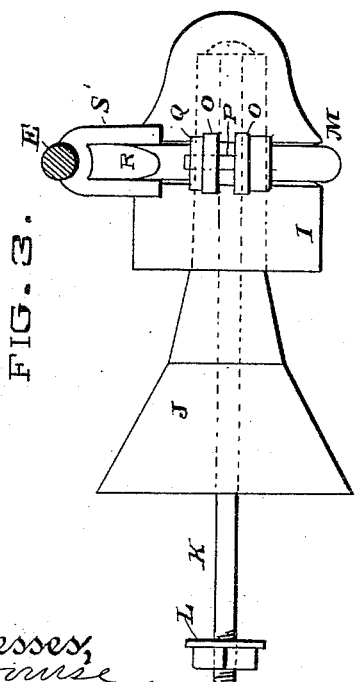
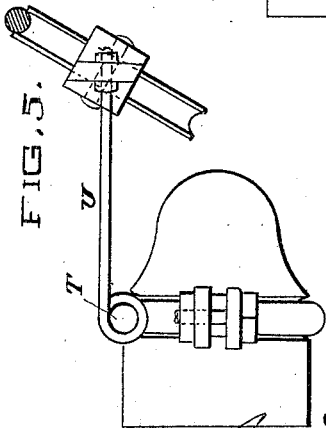
Witnesses
Inventor,
George B. Fraley.

UNITED STATES PATENT OFFICE.

GEORGE B. FRALEY, OF SAN FRANCISCO, CALIFORNIA.

ELECTRIC RAILWAY.

SPECIFICATION forming part of Letters Patent No. 411,496, dated September 24, 1889.

Application filed June 21, 1889. Serial No. 315,097. (No model.)

*To all whom it may concern:*

Be it known that I, GEORGE B. FRALEY, of the city and county of San Francisco, State of California, have invented an Improvement in Electric Railways; and I hereby declare the following to be a full, clear, and exact description of my invention.

My invention relates to certain improvements in electric railways.

It consists in certain details of construction, which will be more fully explained by reference to the accompanying drawings, in which—

Figure 1 is a longitudinal vertical section showing my invention. Fig. 2 is a transverse section. Figs. 3, 4, 5, 6, and 7 are enlarged views of the insulator and guides for the conductor.

In the present case I have shown my invention applied to that class of railways in which the conductor or conductors of the electric current are laid in a tube or conduit beneath the surface of the ground and with suitable relation to the roadway and track upon which the car travels. In the present case I have shown a single conductor, the ground serving for the return-current. This tube or conduit A is made in any suitable or well-known manner, and has at the top continuous parallel slot-irons B, between which the shank C of the trolley travels. At the lower end of this shank is journaled a trolley-wheel D, which travels upon the conductor E, receiving the electrical current continuously from this conductor and transmitting it to the motor on the car.

Considerable difficulty has been encountered in the construction of these sub-electrical ways in properly insulating the conductor and in maintaining it parallel with the roadway, so that the trolley-wheel should always travel in contact with it. In my invention this conductor is made of wire or cable and is formed in sections of any suitable or convenient length. At the ends of these sections are journaled pulleys F, over which the ends of the adjacent wires E pass and are fixed to weights G, which are suspended from them within the pit H, as shown, these weights being sufficiently heavy to maintain the proper tension upon the conductors E, so that they will not sag between the supports in hot weather, or by reason of the distance between these supports, the weights being sufficient to maintain each section of wire in the proper relative position to the track, so that the trolley-wheel will travel in contact with it. Any contraction of the wire due to the cold is permitted, as the weight will be raised slightly by this contraction. The wire will thus be always maintained at the proper tension. In order to insulate the supports for this wire in the most economical manner, I have employed the ordinary glass telegraph-insulators I, which are fixed upon wooden bases J, these bases having each a screw-shank K, which passes through a hole bored in the angle-iron frame of the tube or conduit, and is secured by a nut L, which screws upon the outer end. The glass insulator I has the usual groove M, which is formed around it for the purpose, when used for aerial wires, of securing said wires to the insulator. In my invention I have shown clamps N made in two halves and having an inner circumference of such shape as to fit into this groove or channel M. Lugs O are formed upon these sectional clamps, and bolts P pass through holes in these lugs and are secured by nuts Q upon the outer ends, thus securing the sectional clamps firmly upon the insulators. The upper section of the clamp N has upwardly-projecting lugs R, between which is fitted a block of soft rubber S, having in it a groove or channel of the proper shape to receive and support the conducting-wire E. These supports are fixed at intervals along the tube or tunnel, and where the line is straight the weights G will be sufficient to keep the conducting-wire E at all times straight, so that the trolley-wheel D will travel upon it, while the elastic nature of the rubber block S will admit of enough movement to relieve the insulators from the pressure of the trolley-wheel as it passes over them.

Whenever corners are to be turned, the sections of conducting-wire which pass around the corner will each have their own independent means for producing the tension. In this case I have shown the upper part of the clamps N as provided with lugs T, which project outwardly upon each side, and around these lugs one or two coils of spring-wire are passed. These wires U are extended out to a short distance, and upon the outer ends are fixed the arms V, within which are journaled the grooved pulleys or wheels W. The conducting-wires E rest in the grooves of these pulleys and are supported thereby. These pulleys are placed at any desired angle between vertical and horizontal, so as to properly support the wire, and the elasticity of the arms U will in this case be sufficient to provide for the necessary relief of the pressure caused by the passage of the trolley-wheel over the supporting-pulleys. These supports W may be made of any other shape, if desired; but I have shown them made in the form of pulleys, so that any movement of the wire E longitudinally could be easily accomplished without dragging or rubbing upon the grooved surfaces which support it.

In Fig. 1, $a$ is a bridge, over which the trolley-wheel passes between adjacent ends of conductors, and $b$ is a switch-connection between these separated conductors.

Having thus described my invention, what I claim as new, and desire to secure by Letters Patent, is—

1. In an electrical railway, the slotted underground conduit, a conductor extending longitudinally within said conduit, insulated supports extending over the sides of the conduit, pulleys journaled at intervals between the supports over which the ends of adjacent conducting-wires are passed, and weights suspended beneath said pulleys from the ends of these wires, substantially as herein described.

2. In an underground electrical conduit, the conductor made in sections supported upon insulated bearing-arms at intervals throughout the conduit, the end of each section passing over the periphery of the pulley journaled beneath it, and weights attached to the depending ends of the said sections, so as to produce an automatically-adjustable tension at all times upon the conducting-wires, substantially as described.

3. The underground electrical conduit, the conductor extending through said conduit, and the insulating-supports consisting of the cylindrically-grooved insulators I, the clamps N, fitting said grooves and secured thereto, and the elastic grooved block S, within which the conducting-wire is supported, substantially as described.

4. The underground electrical conduit, the conducting-wire extending longitudinally therein, the grooved or channeled insulators secured to the side of the conduit, having the elastic arms U projecting therefrom, and the grooved supports W, journaled diagonally, so as to support the conductor around curves, substantially as described.

In witness whereof I have hereunto set my hand.

GEORGE B. FRALEY.

Witnesses:
GEO. H. STRONG,
S. H. NOURSE.